US007139489B2

(12) United States Patent
Nissov et al.

(10) Patent No.: US 7,139,489 B2
(45) Date of Patent: Nov. 21, 2006

(54) SYSTEM AND METHOD OF DISPERSION COMPENSATION IN OPTICAL COMMUNICATION SYSTEMS

(75) Inventors: Morten Nissov, Ocean, NJ (US); Alexei A. Pilipetskii, Colts Neck, NJ (US); Ekaterina Golovchenko, Colts Neck, NJ (US); Jonathan Nagel, Brooklyn, NY (US); Sergey Ten, Horsehead, NY (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 667 days.

(21) Appl. No.: 09/991,154

(22) Filed: Nov. 16, 2001

(65) Prior Publication Data
US 2006/0216035 A1 Sep. 28, 2006

Related U.S. Application Data

(60) Provisional application No. 60/249,347, filed on Nov. 16, 2000, provisional application No. 60/249,346, filed on Nov. 16, 2000.

(51) Int. Cl.
*H04B 10/12* (2006.01)

(52) U.S. Cl. .............. 398/147; 398/140; 398/141; 398/148; 398/158; 398/159; 398/160; 359/341; 359/334; 359/337.5; 385/123; 385/128; 385/126; 385/24; 385/27; 385/31

(58) Field of Classification Search ........ 398/140, 398/141, 147, 148, 158, 159, 160; 359/341, 359/334, 337.5; 385/123, 128, 31, 126, 24, 385/27
See application file for complete search history.

(56) References Cited

U.S. PATENT DOCUMENTS

| 5,696,614 A | 12/1997 | Ishikawa et al. |
| 6,178,038 B1* | 1/2001 | Taylor et al. ............ 359/337.5 |
| 6,188,823 B1* | 2/2001 | Ma ............................ 385/123 |
| 6,324,317 B1* | 11/2001 | Tanaka et al. ................ 385/24 |
| 6,366,728 B1* | 4/2002 | Way et al. ................... 385/123 |
| 6,417,961 B1* | 7/2002 | Sun et al. ................ 359/337.5 |
| 6,466,362 B1* | 10/2002 | Friedrich .................... 359/334 |
| 6,681,082 B1* | 1/2004 | Tanaka et al. .............. 398/158 |

FOREIGN PATENT DOCUMENTS

| EP | 0734105 | 9/1996 |
| EP | 1035671 | 9/2000 |
| WO | WO9943107 | 8/1999 |

OTHER PUBLICATIONS

R.W. Tkach et al., "Transmission of Eight 20-Gb/s Channels Over 232 km of Conventional Single-Mode Fiber", IEEE Photonics Technology Letters, IEEE Inc., New York, US, vol. 7, No. 11, Nov. 1, 1995, pp. 1369-1371.

K. Aida et al, "Design and Performance of a Long-span IM/DD Optical Transmission System Using Remotely Pumped Optical Amplifiers", IEE Proceedings, vol. 137, No. 4, Pt. J, Aug. 1, 1990, pp. 225-229.

* cited by examiner

*Primary Examiner*—Hanh Phan

(57) ABSTRACT

A method of compensating for chromatic dispersion in an optical signal transmitted on a long-haul terrestrial optical communication system including a plurality of spans, including: allowing chromatic dispersion to accumulate over at least one of the spans to a first predetermined level; and compensating for the first pre-determined level of dispersion using a dispersion compensating fiber causing accumulation of dispersion to a second predetermined level. There is also provided a hybrid Raman/EDFA amplifier including a Raman portion and an EDFA portion with a dispersion compensating fiber disposed therebetween. An optical communication system and a method of communicating an optical signal using such a Raman/EDFA amplifier are also provided.

23 Claims, 3 Drawing Sheets

SYSTEM AND METHOD OF DISPERSION COMPENSATION IN OPTICAL COMMUNICATION SYSTEMS

CROSS REFERENCE TO RELATED APPLICATION

The present application claims the benefit of the filing date of U.S. Provisional Application Nos. 60/249,347 and 60/249,346 filed Nov. 16, 2001, the teachings of which are incorporated herein by reference.

FIELD OF THE INVENTION

This invention relates in general to optical communication systems, and in particular to dispersion compensation in an optical communication system.

BACKGROUND OF THE INVENTION

Long-haul optical communication networks, e.g. networks of lengths greater than 600 kilometers, are particularly susceptible to the effects of chromatic dispersion. Chromatic dispersion results from wavelength-variation of the speed of travel for an optical signal on a fiber, and is manifested by pulse spreading in the transmitted signal and corresponding difficulties in signal detection. In long-haul terrestrial systems, the available fiber base is typically non-zero dispersion shifted fiber (NZ-DSF), which may exhibit a dispersion of 2–4 ps/nm/km. Significant dispersion may thus accumulate over long transmission distances. Long haul systems also suffer from signal attenuation resulting from a variety of factors, including scattering, absorption, and bending.

Compensation for dispersion and attenuation in long-haul systems has been accomplished on a per-span basis by inserting dispersion compensating fibers (DCFs) between stages of a multi-stage rare earth doped fiber amplifier, such as an erbium doped fiber amplifier (EDFAs). EDFA configurations are well known. In general, an EDFA operates by passing an optical signal through an erbium-doped fiber segment, and "pumping" the segment with light from another source such as a laser. The pump source excites erbium atoms in the doped segment, which then serves to amplify the optical signal passing therethrough.

Raman amplifiers and hybrid Raman/EDFA amplifiers are also known. Raman amplification occurs throughout an optical transmission fiber segment when it is pumped at an appropriate wavelength or wavelengths. Each Raman amplifier may contain one or more pumps. Gain is achieved over a spectrum of wavelengths longer than the pump wavelength through the process of Stimulated Raman Scattering. The difference between the Raman amplifier pumped wavelength and the peak of the associated amplified wavelength spectrum at the longer wavelength is referred to as a "Stokes shift." The Stokes shift for a typical silica fiber is approximately 13 THz. Hybrid Raman/EDFA amplifiers combine the features of both Raman and EDFA amplifiers, typically in separate amplifier stages.

Although conventional amplifier configurations may be applied in a system for addressing signal attenuation, the conventional approach of providing dispersion compensation for every span through use of DCF between stages of a multi-stage EDFA has proven to be inefficient. For example, this approach does not consider system optimization through use of an optimum dispersion map. Also, non-linearities limit the amount of power that can be launched into the DCF, which complicates the EDFA design and potentially degrades performance.

Accordingly, there is a need for a system and method for providing improved dispersion compensation in long-haul optical networks.

SUMMARY OF THE INVENTION

According to one aspect of the invention, there is provided a method for compensating for chromatic dispersion in an optical signal transmitted on a long-haul terrestrial optical communication system including a plurality of spans. The method includes: allowing chromatic dispersion to accumulate over at least one of the spans to a first predetermined level; and compensating for the first predetermined level of dispersion using a dispersion compensating fiber causing accumulation of dispersion to a second predetermined level. Dispersion compensation may be achieved using a dispersion compensating fiber in combination with a rare earth doped fiber amplifier, e.g. an EDFA.

According to another aspect of the invention, dispersion compensation may be achieved using a Raman/EDFA amplifier consistent with the invention, which includes a Raman portion, an EDFA portion and at least one dispersion compensating fiber disposed between the Raman portion and the EDFA portion. Use of a Raman/EDFA amplifier consistent with the invention allows improved noise performance and reduced system complexity.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
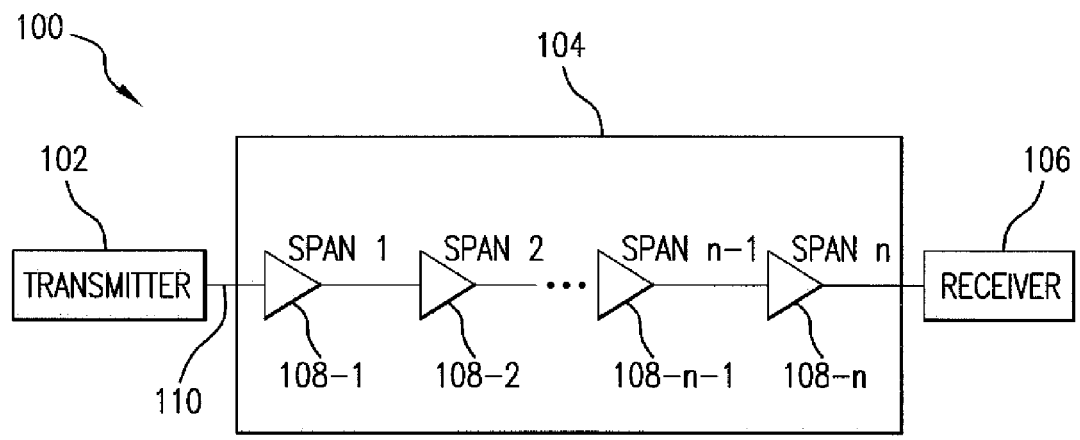
FIG. 1 is a block diagram of an exemplary multi-span optical communication system consistent with the present invention.

Turning now to FIG. 1, there is illustrated an exemplary optical communication system 100 consistent with the present invention. Those skilled in the art will recognize that the system 100 has been depicted as a highly simplified point-to-point system for ease of explanation. It is to be understood the present invention may be incorporated into a wide variety of optical networks, systems, and optical amplifiers without departing from the spirit and scope of the invention.

The optical communication system 100 includes a transmitter 102 and a receiver 106 connected via an optical information channel 104. At the transmitter, data may be modulated on a plurality of wavelengths for transmission over the optical information channel 104. Depending on system characteristics and requirements, the optical information channel 104 may include an optical path 110, e.g., optical fiber, optical amplifiers 108-1, 108-2, 108-n-1, 108-n, optical filters, and other active and passive components. A variety of configurations for each of these elements will be known to those skilled in the art. For clarity, only optical amplifiers 108-1, 108-2, 108-n-1, 108-n and the optical path 110 are illustrated in the optical information channel 104.

In general, the distance between optical amplifiers defines a span length. For example, in the illustrated exemplary embodiment the distance from the first amplifier 108-1 to the second amplifier 108-2 defines Span 1. Those skilled in the art will recognize that span lengths may vary significantly in a particular system. In a long-haul terrestrial system, for example, some spans may be as short as 20 kilometers, while the average span may be about 70 kilometers to about 100 kilometers depending on system characteristics and requirements. In view of the span length variation, signal attenuation and dispersion vary from span-to-span.

Figure 2:
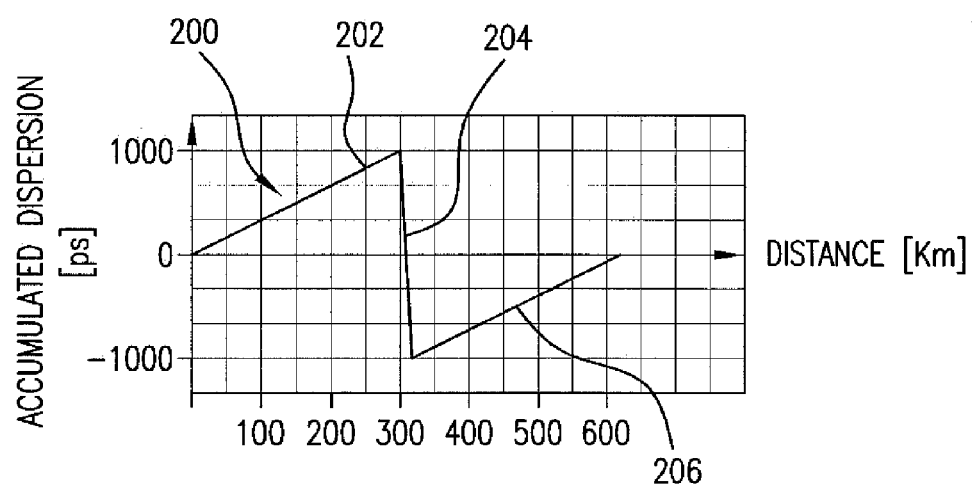
FIG. 2 is an exemplary dispersion map consistent with the present invention.

Consistent with the present invention, dispersion compensation in a long-haul terrestrial network may be accomplished according to a dispersion map that allows accumulation of dispersion over a number of spans before providing compensation. Turning to FIG. 2, for example, there is illustrated an exemplary dispersion map, represented by plot 200, for an exemplary system 100 consistent with the invention. In the illustrated embodiment, the plot 200 has several portions 202, 204, 206. The first portion 202 indicates accumulation of dispersion over about 200 kilometers of the optical path 110, typically NZ-DSF in terrestrial systems. The second portion 204 of the plot indicates compensation for the accumulated dispersion down to −1,000 ps, e.g. resulting from a DCF. Finally, the third portion 206 of the plot 200, indicates accumulation of dispersion over the optical path until the accumulated dispersion returns to a desired predetermined level of about 0 ps at about 600 kilometers. With longer multi-span communication systems, such an exemplary dispersion plot can be repeated until the desired transmission distance is reached.

The dispersion map for a particular system may be selected, for example, by determining the configuration of the existing terrestrial fiber plant and allocating dispersion compensation only to relatively low-loss spans in the system. Dispersion may thus be allowed to accumulate over long spans (e.g., Span 1 and Span 2) but may be compensated on the occurrence of a relatively low loss span (e.g., Span n−1). For example, in a system where loss in longer spans is between about 15 to 25 dB, a relatively low-loss span would be a span exhibiting attenuation of from about 5 to 15 dB.

Thus, in contrast to conventional long-haul terrestrial systems wherein dispersion compensation is provided for every span, dispersion compensation may be strategically allocated to selected spans according to a predetermined dispersion map. Dispersion compensation may be accomplished by a variety of means. Compensation may be achieved, for example, by insertion of a multi-stage EDFA with one or more DCFs inserted between the stages. If the EDFA with the DCF is inserted into a low loss span, the amount of power launched into the DCF may be minimized, thereby optimizing performance of the EDFA. Allowing dispersion to accumulate over several spans according to a dispersion map consistent with the invention also reduces the cost and complexity of the system.

Figure 3:
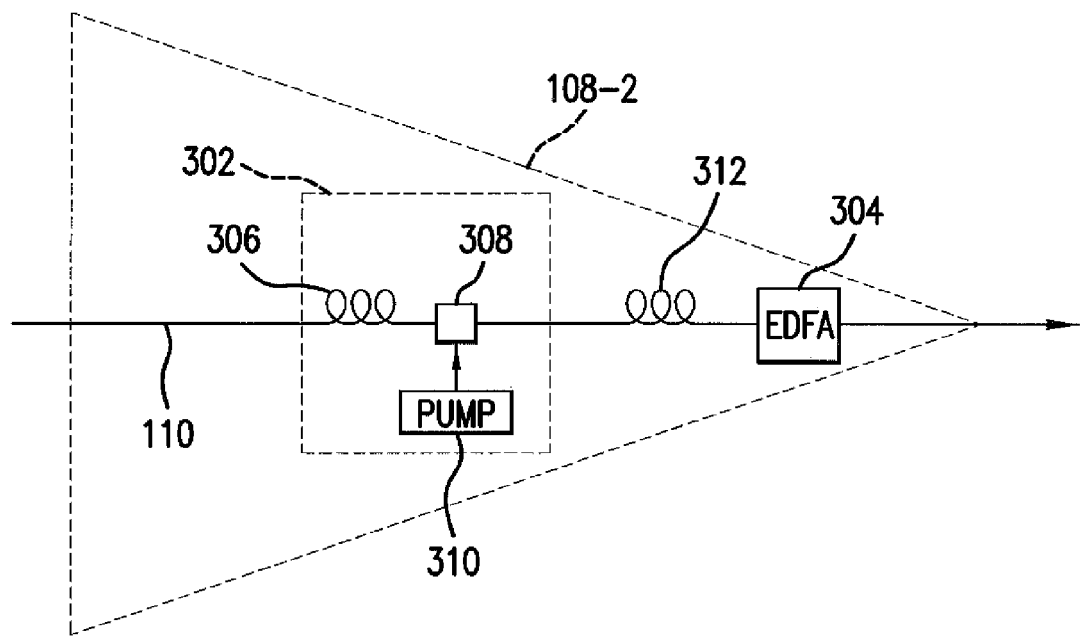
FIG. 3 is block diagram of one exemplary hybrid Raman/EDFA amplifier consistent with the invention.

Dispersion compensation may also be accomplished through use of a hybrid Raman/EDFA amplifier consistent with the invention. An exemplary embodiment of a hybrid Raman/EDFA amplifier 108-2 consistent with the invention is illustrated in FIG. 3. In the illustrated exemplary embodiment, the optical amplifier 108-2 includes a Raman portion 302 and an EDFA portion 304. The Raman portion 302 may include a fiber transmission path segment 306 in which Raman gain is generated for amplifying an optical signal propagating through the path 110. Energy from a pump source 310 is coupled to the segment 306 of path 110 by a coupler 308, e.g., a WDM. One or more Raman pump sources 310 may be coupled to the optical path 110 in a wide variety of configurations known to those skilled in the art. An exemplary Raman pump may include a grating stabilized Fabry-Perot laser with a pump power of 1.4 watts at a wavelength of 1450 nm to provide 10 dB of Raman gain. Alternatively, Raman portion 302 may also include DCF fiber (not shown) similar to the DCF 312. Thus, within the Raman portion 302, there may be provided DCF fiber, which is coupled to the existing transmission fiber 110.

Figure 4:
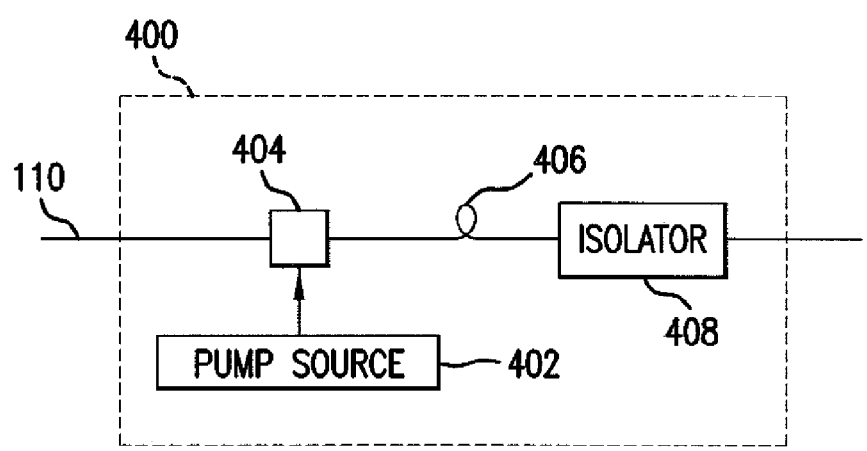
FIG. 4 is a block diagram of an exemplary single-stage EDFA useful in connection with the optical amplifier of FIG. 3.

The EDFA portion 304 may be a single or multi-stage EDFA. An exemplary single-stage EDFA 400 is illustrated in FIG. 4. A single-stage EDFA may include an EDFA pump source 402, a coupler 404, one erbium-doped fiber segment 406, and an isolator 408. In contrast, a two-stage EDFA has two separate erbium doped segments and typically two separate pump sources. Those skilled in the art will recognize a variety of EDFA pump sources that may be controlled locally or remotely for use with the single-stage EDFA. Also, it will be recognized that the pump sources may be coupled to the optical path 110 in a wide variety of coupling configurations.

A Raman/EDFA amplifier consistent with the invention also includes a DCF 312 disposed between the Raman portion 302 and the EDFA portion 304, as illustrated in FIG. 3. Placement of the DCF between the Raman and EDFA stages has significant advantages compared to conventional two-stage EDFAs with a DCF between EDFA stages. For example, use of a Raman/EDFA amplifier consistent with the invention allows for improved noise performance compared to conventional two-stage EDFAs. This can facilitate frequent insertion of shorter lengths of DCF in the optical path for maintaining desired dispersion levels. Also, difficulties associated with EDFA and system design for limiting launch power from an EDFA into a DCF are eliminated.

Figure 5:
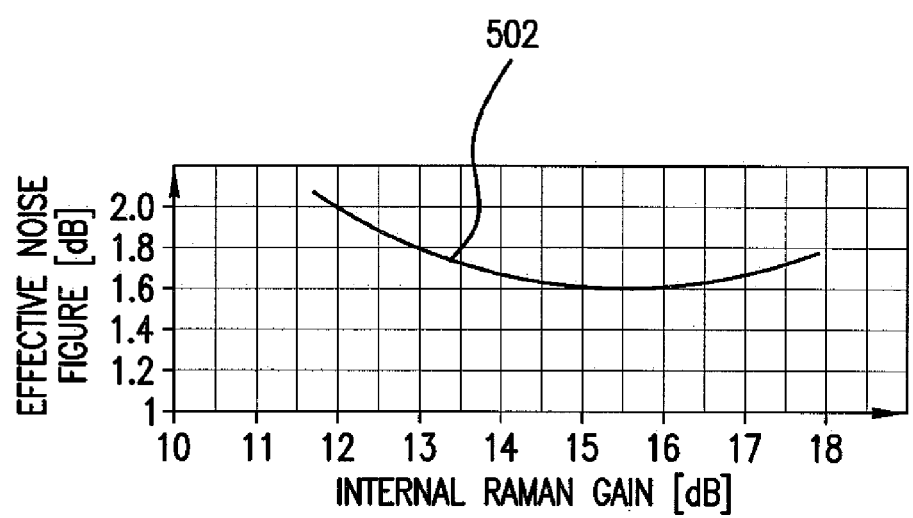
FIG. 5 is an exemplary plot of effective noise figure versus Raman gain for an exemplary Raman/EDFA amplifier consistent with the present invention.

In operation, the Raman portion of an exemplary Raman/EDFA amplifier consistent with the invention may be pumped by pump source 310 in a counter-propagating fashion to provide, e.g., 10–15 dB of Raman gain. The Raman gain may be set depending on system characteristics in order to optimize the Raman gain while minimizing the effects of noise accumulation and multi-path interference (MPI). FIG. 5 illustrates an exemplary plot 502 of Raman gain in dB versus effective noise figure in dB for the exemplary Raman/EDFA amplifier 108-2 consistent with the invention. The exemplary plot 502 illustrates exemplary performance for an amplifier span length of 80 kilometers. As shown, a Raman gain of about 15 dB is optimum in the exemplary embodiment. This gain results in the lowest effective noise figure of about 1.6 dB for the Raman/EDFA amplifier and also minimizes MPI. In this embodiment, therefore, a Raman assisted EDFA amplifier consistent with the present invention may improve the signal to noise ratio (SNR) by as much as about 2.4 dB compared to a typical EDFA with a good noise figure of 4 dB. (4.0 dB−1.6 dB=2.4 dB).

The EDFA portion 304 provides the remaining gain, e.g., an additional 5–15 dB, to compensate for the remaining fiber loss over any particular span. The total Raman/EDFA gain may thus be in the range from about 10–25 dB. For example, if the Raman gain for the system illustrated in FIG. 5 were set to 15 dB to minimize noise figure, an EDFA providing gain of less than 10 dB would be appropriate for typical span losses. The level of EDFA and Raman gain may, of course, be varied depending on the particular system characteristics including losses over each particular span. The Raman and EDFA gains may be varied to properly compensate for fiber losses over a particular span but to optimize the Raman gain to minimize the effective noise figure for the Raman/EDFA amplifier and to minimize MPI. As known to those skilled in the art, Raman gain may be adjusted by varying pump powers and/or wavelengths from the Raman pump source 310.

To provide a medium level of EDFA gain necessary in a Raman/EDFA amplifier consistent with the present invention, e.g., from about 5 db to about 15 dB, a single-stage EDFA amplifier with a high pump power may be used. This allows for vastly improved noise performance compared to a conventional two stage EDFA with a DCF in between the stages. Also, the DCF 312 allows adherence to a dispersion map as illustrated, for example, in FIG. 2. That is, dispersion may be a owed to accumulate for several spans before being overcompensated by a DCF 312 and finally allowed to accumulate back to near zero or some desired small path-average dispersion.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A method of compensating for chromatic dispersion in an optical signal transmitted on a long-haul terrestrial optical communication system including a plurality of spans, said method comprising:
    allowing chromatic dispersion to accumulate over a plurality of spans in a transmission path, said transmission path including a plurality of high loss spans, at least some of said high loss spans extending from one optical amplifier to another optical amplifier; and
    identifying a plurality of non-periodically spaced low loss spans in said transmission path, at least some of said low loss spans extending from one optical amplifier to another optical amplifier, each of said low loss spans having an associated loss lower than a loss associated with each of said high loss spans in said transmission path;
    compensating for dispersion accumulated on said plurality of spans using a plurality of separate dispersion compensating fibers, each of said dispersion compensating fibers being directly coupled to an associated one of said low loss spans.

2. The method of claim 1, wherein at least one of said dispersion compensating fibers is disposed between stages of a multi-stage rare earth doped amplifier.

3. The method of claim 2, wherein said rare earth doped amplifier is an erbium doped amplifier.

4. The method of claim 1, wherein at least one of said dispersion compensation fibers is disposed in an amplifier following said low loss span.

5. The method of claim 1, wherein at least one of said dispersion compensating fibers is disposed between a Raman portion and an EDFA portion of a Raman/EDFA amplifier.

6. The method of claim 5, further comprising:
    configuring a gain of said Raman portion to achieve a desired noise figure level for said Raman/EDFA amplifier.

7. The method of claim 6, wherein said gain of said Raman portion is about 10–15 dB.

8. The method of claim 6, further comprising:
    configuring a gain of said EDFA portion to achieve a predetermined total gain for said Raman/EDFA amplifier.

9. The method of claim 8, wherein said gain of said EDFA portion is about 5–15 dB.

10. The method of claim 5, wherein said EDFA portion of said Raman/EDFA amplifier is a single-stage EDFA.

11. The method of claim 1, wherein said signal is transmitted a distance of greater than 600 kilometers.

12. The method of claim 1, wherein said loss associated with said high loss spans is between about 15–25 dB, and wherein said loss associated with said low loss spans is between about 5–15 dB.

13. The method of claim 1 wherein identifying at least one low loss span includes identifying a plurality of low loss spans in said transmission path, and wherein compensating for dispersion includes compensating for dispersion using dispersion compensating fibers directly coupled to each of said low loss spans.

14. A method of communicating an optical signal on an optical communication system comprising:
    transmitting said optical signal over an optical path, said optical path including a plurality of spans, at least some of said spans extending from one optical amplifier to another optical amplifier;
    allowing chromatic dispersion to accumulate over a group of said plurality of spans of said optical path to a first predetermined level;
    amplifying said optical signal with at least one Raman/EDFA amplifier coupled to said optical path, said amplifier comprising a Raman portion having a Raman gain selected to achieve a desired noise figure level for said Raman/EDFA amplifier and an EDFA portion having an EDFA gain selected to achieve a predetermined total gain for said Raman/EDFA amplifier; and
    non-periodically compensating for accumulated dispersion of said optical signal using a dispersion compensating fiber disposed between said Raman portion and said EDFA portion of said at least one Raman/EDFA amplifier.

15. The method of claim 14, wherein said Raman gain is about 10–15 db.

16. The method of claim 14, wherein said EDFA gain is about 5–15 dB.

17. The method of claim 14, wherein said EDFA portion of said Raman/EDFA amplifier is a single-stage EDFA.

18. The method of claim 14, wherein said signal is transmitted a distance of greater than 600 kilometers.

19. The method of claim 14, wherein said dispersion compensating fiber is disposed within said Raman portion of a Raman/EDFA amplifier.

20. An optical communication system comprising:
    a transmitter configured to transmit an optical signal over an optical information path to a receiver, said optical information path comprising:
    a plurality of spans including high loss spans and low loss spans, at least some of said spans extending from one optical amplifier to another optical amplifier, each of said low loss spans having an associated loss lower than a loss associated with said high loss spans; and a plurality of Raman/EDFA amplifiers having a Raman portion and an EDFA portion, wherein at least one Raman/EDFA amplifier of said plurality of Raman/EDFA amplifiers further includes at least one dispersion compensating fiber coupled to one of said low loss spans such that said optical communication system is configured to allow dispersion to accumulate in said high loss spans and to compensate for dispersion directly following said one of said low loss spans.

21. The system of claim 20 wherein said dispersion compensating fiber is disposed between said Raman portion and said EDFA portion.

22. The system of claim 20 wherein said dispersion compensating fiber is disposed within said Raman portion.

23. The method of claim 20, wherein said loss associated with said high loss spans is between about 15–25 dB, and wherein said loss associated with said low loss spans is between about 5–15 dB.

* * * * *

UNITED STATES PATENT AND TRADEMARK OFFICE
CERTIFICATE OF CORRECTION

PATENT NO. : 7,139,489 B2  Page 1 of 1
APPLICATION NO. : 09/991154
DATED : November 21, 2006
INVENTOR(S) : Morten Nissov et al.

It is certified that error appears in the above-identified patent and that said Letters Patent is hereby corrected as shown below:

On Title Page Item (75)

Delete "Alexei A. Pilipetskii" and insert --Alexei N. Pilipetskii--;

Column 5, line 23, delete "a owed" and insert --allowed--.

Signed and Sealed this

Twenty-seventh Day of March, 2007

JON W. DUDAS
*Director of the United States Patent and Trademark Office*